United States Patent Office 3,438,750
Patented Apr. 15, 1969

3,438,750
PALLADIUM CARBONYL HALIDE AND
METHODS FOR ITS PREPARATION
Wilhelm J. Schnabel, Branford, Ehrenfried H. Kober, Hamden, and Strong K. Gardner, North Haven, Conn., assignors to Olin Mathieson Chemical Corporation, a corporation of Virginia
No Drawing. Continuation of application Ser. No. 629,359, Apr. 10, 1967. This application Apr. 30, 1968, Ser. No. 739,985
Int. Cl. C01g 55/00
U.S. Cl. 23—367                                    10 Claims

ABSTRACT OF THE DISCLOSURE

A new composition of matter having the formula $$[Pd(CO)X]_n$$

where X is a halogen and where $n$ is an integer in a range between about 2 and about 100,000. This composition is prepared by reacting carbon monoxide with a palladium-containing material selected from the group consisting of (a) palladium dihalide
(b) a mixture of elemental palladium with an acid halide, and
(c) mixtures thereof, in the presence of a liquid reaction medium.

---

This is a continuation of application Ser. No. 629,359, filed Apr. 10, 1967, and now abandoned.

This invention relates to a novel palladium-containing composition and to processes for preparing it.

Metal carbonyl chlorides have been used extensively as carbonylation agents. One of the problems encountered in the use of these materials, particularly when the metal is palladium, is that the material decomposes rapidly. Thus it is necessary to use the palladium carbonyl halide almost immediately after its preparation in order to obtain any significant benefit from the use of this type of compound.

W. Manchot and J. König, Chem. Ber. Bd. 59, S. 883 (1926) disclose a technique for preparing a palladium carbonyl chloride having the formula

by reacting palladium dichloride with carbon monoxide in the presence of alcohol at elevated temperatures. The palladium carbonyl chloride prepared by this technique is difficult to isolate, and once isolated, it is extremely unstable.

German Patent No. 1,222,484, published Aug. 11, 1966, discloses a process for preparing the compound having the formula

by reacting palladium benzonitrile chloride complex with carbon monoxide. Although this compound appears to be more stable than the compound prepared by Manchot et al., the stable period has only been extended to about 5 hours.

It is an object of this invention to provide a novel palladium carbonyl halide.

Another object of this invention is to provide processes for preparing a palladium carbonyl halide.

Still another object of the invention is to provide a palladium carbonyl chloride having markedly improved stability.

These and other objects of the invention will be apparent from the following detailed description.

It has now been discovered that the foregoing objects are accomplished when carbon monoxide is reacted with a palladium-containing material selected from the group consisting of (a) palladium dihalide, (b) a mixture of elemental palladium with an acid halide, and (c) mixtures thereof, in the presence of a liquid reaction medium selected from the group consisting of a halogenated hydrocarbon and an aromatic hydrocarbon.

More in detail, the palladium-containing substance is selected from a group consisting of (a) palladium dihalide, (b) a mixture of elemental palladium with an acid halide, and (c) mixtures thereof. The palladium dihalide is selected from the group consisting of palladium dichloride, palladium dibromide, palladium diiodide, and palladium difluoride. The palladium dihalide or elemental palladium are used preferably in powdered form, in order that the maximum surface area is available for reaction. However, when a rapid reaction rate is not necessary, granulated or pelleted forms may be employed.

The reaction between the palladium-containing material and carbon monoxide is effected in the presence of a liquid reaction medium. It is preferred to employ halogenated aromatic hydrocarbons such as monochlorobenzene, dichlorobenzene, trichlorobenzene, monochloronaphthalene, chlorinated biphenyl, dichlorotoluene, dichloroxylene, mixtures thereof, and the like. Suitable halogenated aliphatic hydrocarbons include dichloromethane, tetrachloroethane, trichloroethylene, perchloroethylene, chloroform, carbon tetrachloride, trichloropropane, fluorinated hydrocarbons such as trichlorofluoromethane, trichlorotrifluoroethane, tetrachlorodifluoroethane, mixtures thereof, and the like.

Other suitable liquid reaction mediums include aromatic hydrocarbons and alkyl-substituted aromatic hydrocarbons, which are all herein referred to as "aromatic hydrocarbons." Typical aromatic hydrocarbons include benzene, toluene, xylene, methyl naphthalene, mixtures thereof, and the like.

When a mixture of elemental palladium and acid halide is the palladium-containing material, the liquid reaction medium contains between about 2 and about 50 percent by weight of an acid halide. Suitable acid halides include phosgene, thionyl chloride, sulfuryl chloride, oxalylchloride, benzene-sulfonylchloride, benzoylchloride, thionyl bromide, thionyl fluoride, phosphorus oxychloride, phosphorus oxyfluoride, phosphorus oxybromide, vanadyl monobromide (VOBr), vanadyl dibromide (VOBr$_2$), vanadyl tribromide (VOBr$_3$), vanadyl chloride (VO)$_2$Cl, vanadyl dichloride (VOCl$_2$), vanadyl trichloride (VOCl$_3$), mixtures thereof, and the like. Other suitable acid halides are disclosed in Canadian Patent No. 692,093, issued Aug. 4, 1964, to Ehrenfried H. Kober et al. If desired, an acid halide may also be employed in the same proportions when the palladium-containing material is palladium dihalide, but it is not essential in the latter case.

The proportion of liquid reaction medium is not critical, and any proportion may be employed which will not require excessively large equipment to contain. Generally, the weight percent of palladium-containing material in the liquid reaction medium is in the range between about 0.1 and about 75.0 percent, but greater or lesser proportions may be employed if desired.

When carrying out the process of this invention, carbon monoxide is fed to a suspension of the palladium-containing substance in the liquid reaction medium by any suitable technique. In one embodiment, the palladium-containing material and liquid reaction medium are charged to a suitable pressure vessel such as an autoclave which was previously purged with nitrogen, and which is preferably provided with agitation means such as a stirrer or an external rocking mechanism. Carbon monoxide is then fed into the autoclave until the desired pressure is attained.

Generally the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The total amount of carbon monoxide charged during the reaction is generally between about 2 and about 500, and preferably between about 100 and about 250 moles of carbon monoxide per gram-atomic weight of palladium in the palladium-containing material. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction pressure may be sub-atmospheric, atmospheric or superatmospheric. Generally the reaction pressure is in the range between about 14 and about 8000 p.s.i.a., and preferably between about 14.7 and about 4000 p.s.i.a., but greater or lesser pressures may be employed, if desired.

The reaction temperature is maintained above about 20° C. and preferably between about 100 and about 250° C. Interior and/or exterior heating and cooling means may be employed to maintain the temperature within the reactor within the desired range.

The reaction time is dependent upon the palladium-containing material being reacted, as well as the type of equipment being employed. Usually between about 0.5 hour and about 3.0 hours are required to obtain the desired degree of reaction, but shorter, or longer reaction times may be employed.

The reaction can be carried out batchwise, semi-continuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the novel solid palladium carbonyl halide complex from the liquid reaction medium. The novel compound of this invention has the structural formula $$[Pd(CO)X]_n$$

where X is selected from the group consisting of chlorine, bromine, fluorine, and iodine, and where $n$ is an integer greater than 1, and which is generally between about 2 and about 100,000. The novel palladium carbonyl halide complex of this invention, because of its exceptional stability, is useful as a carbonylation agent in a wide variety of commercial processes. It is particularly useful as a catalyst in the reaction between carbon monoxide and an aromatic nitro compound in which the corresponding aromatic isocyanate is directly prepared.

The following examples are presented to further illustrate the invention without any intention of being limited thereby. All parts and percentages are by weight unless otherwise specified.

EXAMPLE 1

A rocking autoclave, having a volume of approximately 103 ml. and a glass insert liner, was charged with 0.36 g. (0.002 mole) of palladium dichloride and 10 ml. ortho-dichlorobenzene. The reactor was pressurized with carbon monoxide to a pressure of 2500 p.s.i.g., and the contents were heated to 190° C. for 1.5 hours. At the end of the reaction, the contents of the autoclave were cooled to room temperature and the autoclave was vented. The reaction product was filtered and the solid reaction product collected on the filter was washed with benzene and petroleum ether. The yellowish green solid weighed 0.31 g., which represented a 90 percent yield of product. Elemental analysis of the solid product showed the empirical formula to be $$[Pd(CO)Cl]_n$$

Infrared analysis of the product showed a carbonyl absorption at 1980 cm.$^{-1}$. The solid product was only slightly soluble in organic solvents and did not change composition after storage at room temperature in a closed container for several months. The composition decomposed when heated above 200° C. and showed no sharp melting point.

EXAMPLE 2

The autoclave of Example 1 was charged with palladium powder (0.2 g.) and 10 ml. of ortho-dichlorobenzene containing 5 percent phosgene. The autoclave was pressurized with carbon monoxide and heated as in Example 1. Analysis of the green solid reaction product indicated that it was virtually indentical to the composition obtained in Example 1 except for slight contamination with some unreacted palladium metal.

EXAMPLE 3

Palladium dichloride (0.89 gram) was placed under a blanket of dry nitrogen in 400 ml. of chloroform. Carbon monoxide was passed through the suspension for five hours. Analysis of the resulting yellowish green solid product showed it to be virtually identical to the composition obtained in Example 1, except for a slight contamination of some unreacted palladium chloride.

EXAMPLE 4

Palladium dichloride (0.36 gram) was admixed with 10 ml. of ortho-dichlorobenzene containing 5 percent phosgene in the autoclave of Example 1. The procedure of Example 1 was employed. A palladium carbonyl chloride corresponding to that of Example 3 was obtained.

EXAMPLE 5

The autoclave of Example 1 was employed in this reaction. The palladium carbonyl chloride compound produced in Example 1 (0.075 g.), molybdenum dioxide (0.09 g.), and 5 ml. of ortho-dichlorobenzene were added to the autoclave. The autoclave was closed, purged, and then pressurized with carbon monoxide to a pressure of 2500 p.s.i.g. The autoclave contents were heated to a temperature of 190° C. for 1.5 hours while maintaining a pressure of 3840 p.s.i.g. (maximum). After cooling to room temperature, the autoclave was vented, opened, and 3 g. of 2,4-dinitrotoluene were added to the autoclave. The autoclave was closed, purged, and pressurized with carbon monoxide to a pressure of 2500 p.s.i.g. The reactor contents were heated to temperature of 190° C. for a period of 1.5 hours while maintaining a maximum pressure of 3620 p.s.i.g. After cooling to room temperature, the autoclave was vented and the reaction mixture was filtered. A vapor phase chromatography analysis of the filtrate showed a conversion of 44.8 percent of the dinitrotoluene. Of the material converted, 2.8 percent was identified as 2,4-toluenediisocyanate, 4.1 percent was identified as 4-isocyanato-2-nitrotoluene, and 10.9 percent was identified as 2-isocyanato-4-nitrotoluene.

Various modifications of the invention, some of which have been referred to above, may be employed without departing from the spirit of the invention.

We claim:

1. The process for preparing a yellowish-green composition of the formula $[Pd(CO)X]_n$, where X is selected from the group consisting of chlorine, fluorine, bromine and iodine, and where $n$ is an integer in the range between about 2 and about 100,000, which comprises reacting carbon monoxide with a palladium-containing material selected from a group consisting of (a) palladium dihalide, (b) a mixture of elemental palladium with an acid halide, and
(c) mixtures thereof, in the presence of a liquid reaction medium selected from the group consisting of halogenated hydrocarbons and aromatic hydrocarbons.

2. The process of claim 1 wherein said liquid reaction medium is a halogenated hydrocarbon.

3. The process of claim 2 wherein the reaction pressure is in the range between about 14 and about 8000 p.s.i.a.

4. The process of claim 3 wherein the reaction temperature is in the range between about 20 and about 250° C.

5. The process of claim 4 wherein said halogenated hydrocarbon is ortho-dichlorobenzene.

6. The process of claim 4 wherein said halogenated hydrocarbon is monochlorobenzene.

7. The process of claim 4 wherein said halogenated hydrocarbon is chloroform.

8. The process of claim 5 wherein said palladium-containing material is palladium dichloride.

9. The process of claim 5 wherein said palladium-containing material is a mixture of elemental palladium and phosgene.

10. The product produced by the process of claim 1.

References Cited

OTHER REFERENCES

Treiber: Uber Ein Palladiumcarbonyl PdClCO; "Tetrahedron Letters," No. 25, pp. 2831–2832, 1966.

OSCAR R. VERTIZ, *Primary Examiner.*

HOKE S. MILLER, *Assistant Examiner.*

U.S. Cl. X.R.

252—472